United States Patent
Ohbayashi et al.

(10) Patent No.: US 9,097,189 B2
(45) Date of Patent: Aug. 4, 2015

(54) VEHICLE DRIVE CONTROL DEVICE

(75) Inventors: Motonari Ohbayashi, Nisshin (JP); Yuki Minase, Toyota (JP); Shinya Kodama, Toyota (JP); Toshihiro Takagi, Toyota (JP); Masashi Takagi, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 32 days.

(21) Appl. No.: 14/127,557

(22) PCT Filed: Jun. 23, 2011

(86) PCT No.: PCT/JP2011/064481
§ 371 (c)(1),
(2), (4) Date: Dec. 19, 2013

(87) PCT Pub. No.: WO2012/176322
PCT Pub. Date: Dec. 27, 2012

(65) Prior Publication Data
US 2014/0129098 A1   May 8, 2014

(51) Int. Cl.
*F02D 29/02* (2006.01)
*F16H 61/02* (2006.01)
*B60W 50/10* (2012.01)
*B60W 10/10* (2012.01)
*B60W 10/04* (2006.01)
*B60W 30/18* (2012.01)
(Continued)

(52) U.S. Cl.
CPC .............. *F02D 29/02* (2013.01); *B60W 10/04* (2013.01); *B60W 10/06* (2013.01); *B60W 10/10* (2013.01); *B60W 30/18027* (2013.01); *B60W 50/087* (2013.01); *B60W 50/10* (2013.01);
*F16H 61/0204* (2013.01); *B60W 2540/10* (2013.01); *B60W 2540/16* (2013.01); *B60W 2710/0666* (2013.01); *Y10T 477/68* (2015.01)

(58) Field of Classification Search
None
See application file for complete search history.

(56) References Cited

U.S. PATENT DOCUMENTS 4,430,911 A * 2/1984 Morscheck .................... 477/124
4,895,116 A * 1/1990 Haydu ....................... 123/198 D
(Continued)

FOREIGN PATENT DOCUMENTS

JP          61-190135 A        8/1986

OTHER PUBLICATIONS

International Search Report of PCT/JP2011/064481 dated Aug. 9, 2011.

*Primary Examiner* — Rami Khatib
*Assistant Examiner* — Jeffrey Boomer
(74) *Attorney, Agent, or Firm* — Sughrue Mion, PLLC

(57) ABSTRACT

When a driver attempts to hurriedly start driving a stopped vehicle, for example, the driver may, without realizing it, begin operating an accelerator pedal before shifting a shift lever from a non-drive position to a drive position. In such a situation, when the shift lever is shifted from a non-drive position to a drive position while the accelerator pedal is being operated, a drive power limiting process is implemented for limiting the drive power when the drive power is output from a drive source in accordance with the amount that the accelerator is being operated. As a result, when the shift lever is shifted from a non-drive position to a drive position in the abovementioned manner, it is possible to restrict starting of the vehicle, which is caused by the transmission of drive power from the drive source to the wheels. This reduces the strange sensation experienced by the driver.

4 Claims, 3 Drawing Sheets

(51) Int. Cl.
  *B60W 10/06*  (2006.01)
  *B60W 50/08*  (2012.01)

(56) References Cited

U.S. PATENT DOCUMENTS

| | | | | |
|---|---|---|---|---|
| 5,833,572 | A * | 11/1998 | Leising et al. | 477/113 |
| 6,253,138 | B1 * | 6/2001 | Shober et al. | 701/51 |
| 8,118,132 | B2 * | 2/2012 | Gray, Jr. | 180/305 |
| 2009/0131216 | A1 * | 5/2009 | Matsubara et al. | 477/37 |
| 2012/0095657 | A1 * | 4/2012 | Pudvay | 701/53 |
| 2012/0329605 | A1 * | 12/2012 | Kawamura et al. | 477/115 |
| 2013/0143716 | A1 * | 6/2013 | Kodama et al. | 477/109 |
| 2014/0136061 | A1 * | 5/2014 | Ohbayashi et al. | 701/58 |
| 2015/0012198 | A1 * | 1/2015 | Kumazawa | 701/70 |

* cited by examiner

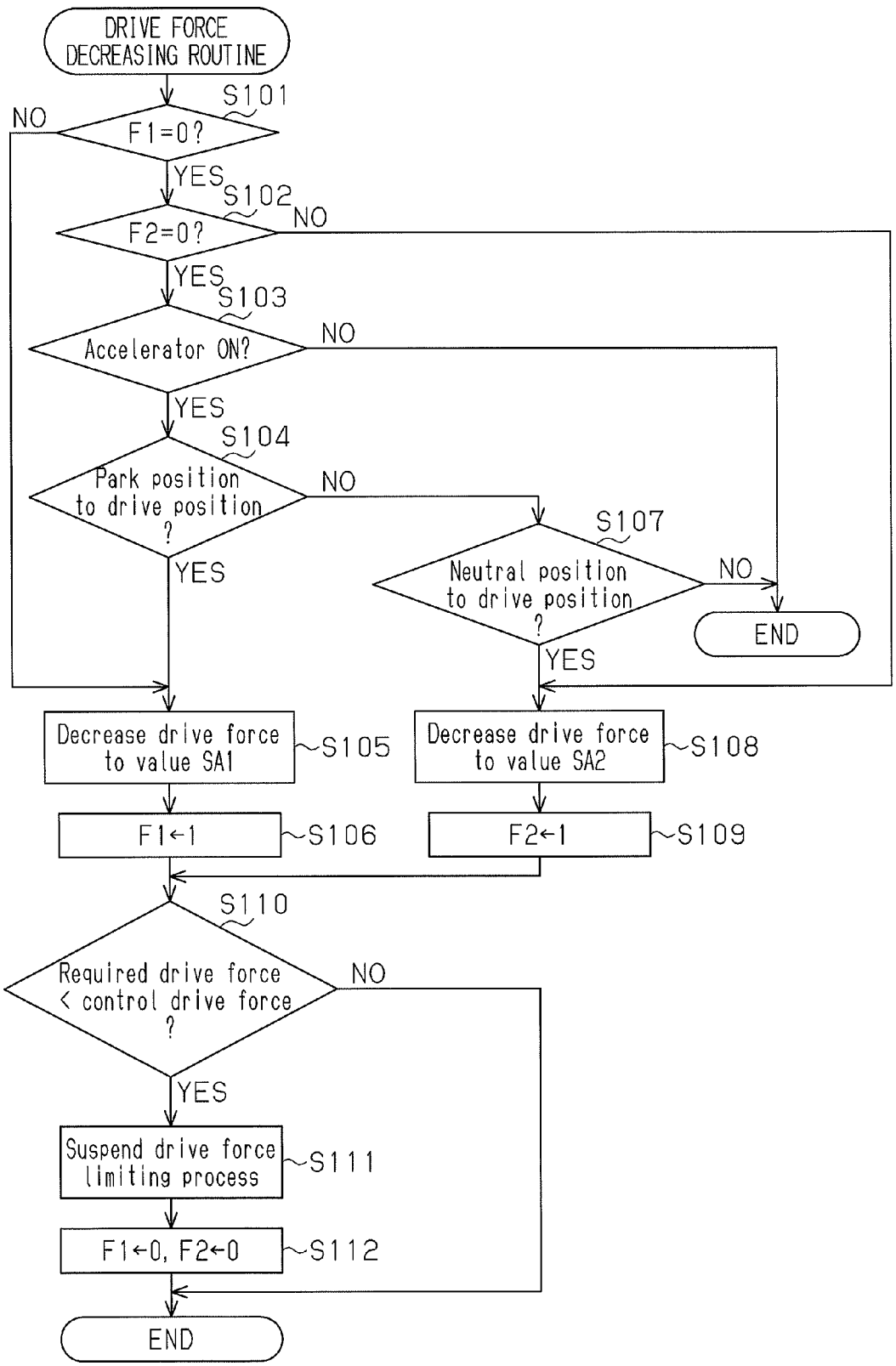

VEHICLE DRIVE CONTROL DEVICE

CROSS REFERENCE TO RELATED APPLICATIONS

This is a National Stage of International Application No. PCT/JP2011/064481 filed Jun. 23, 2011, the content of all of which is incorporated herein by reference in its entirety.

TECHNICAL FIELD

The present invention relates to an operation control device for vehicles.

BACKGROUND ART

As shown in Patent Document 1, a vehicle such as an automobile has a control section for adjusting drive force generated by a drive source in accordance with manipulation of an accelerator by the driver. The drive force of the drive source is transmitted to the wheels of the vehicle, thus allowing the vehicle to move. The vehicle also has a shift mechanism that is switched between a drive position and a non-drive position by the driver. When the shift mechanism is at the drive position, the drive force is transmitted from the drive source to the wheels. When the shift mechanism is at the non-drive position, such transmission of the drive force from the drive source to the wheels is blocked.

PRIOR ART DOCUMENT

Patent Document

Patent Document 1: Japanese Laid-Open Patent Publication No. 61-190135

SUMMARY OF THE INVENTION

Problems that the Invention is to Solve

To start the vehicle from the stopped state, the driver switches the shift mechanism from the non-drive position to the drive position usually before operating the accelerator from the OFF state to the ON state. However, there may be a case where the driver is in a hurry and inadvertently manipulates the accelerator from the OFF state to the ON state before switching the shift mechanism from the non-drive position to the drive position. In other words, while mistakenly assuming that he/she is performing the normal procedure, the driver operates in an unusual manner in which the shift mechanism is changed from the non-drive position to the drive position with the accelerator held in the ON state.

As a result of the above-described unintended unusual operation by the driver, actual behavior of the vehicle is not what the driver expects would happen. Specifically, the driver expects that the vehicle starts when he/she operates the accelerator to the ON state. However, the vehicle actually starts when the drive force is transmitted from the drive source to the wheels by switching the shift mechanism from the non-drive position to the drive position, which is after the accelerator has been operated to the ON state. In other words, the vehicle is started through transmission of the drive force from the drive source to the wheels, which is brought about by switching the shift mechanism from the non-drive position to the drive position with the accelerator held in the ON state. This inevitably causes a strange sensation for the driver and thus decreases drivability of the vehicle.

According to the technique disclosed in Patent Document 1, the drive force of the drive source is reduced to such a level as to prevent the vehicle from moving if the force or speed of depression of the accelerator pedal exceeds a detection level when the transmission in the path of the drive force transmission from the drive source to the wheels has a great gear ratio. However, even the technique of Patent Document 1 cannot prevent the drivability of the vehicle from being lowered by the strange sensation experienced by the driver, which is caused under the aforementioned condition. Specifically, in some cases, the technique does not decrease the drive force generated by the drive source when the shift mechanism is switched from the non-drive position to the drive position with the accelerator held in the ON state. In these cases, the drive force is transmitted from the drive source to the wheels, thus starting the vehicle.

Accordingly, to solve the above-described problem, an objective of the present invention is to provide a drive control device for a vehicle that prevents the driver from experiencing a strange sensation when a shift mechanism is switched from a non-drive position to a drive position with the accelerator held in an ON state and thus maintains drivability of the vehicle without being lowered by such strange sensation.

Means for Solving the Problems

To achieve the foregoing objective, a drive control device for a vehicle according to the present invention executes a drive force limiting process to decrease drive force of a drive source in response to operation of an accelerator when the drive force is output in cases where a shift mechanism is switched from a non-drive position to a drive position with an accelerator held in an ON state. Specifically, these cases include a case where the driver is in a hurry and, in an attempt to start the vehicle quickly, operates the accelerator from the OFF state to the ON state inadvertently before switching the shift mechanism from the non-drive position to the drive position. In this case, when the shift mechanism is switched from the non-drive position to the drive position with the accelerator held in the ON state, transmission of the drive force from the drive source to the wheels is initiated and the vehicle is started. This causes the driver to feel strange. However, under this condition, the drive force limiting process is carried out to decrease the drive force output from the drive source, thus preventing the driver from feeling strange. That is, the strange sensation caused by switching of the shift mechanism from the non-drive position to the drive position with the accelerator held in the ON state is prevented from being caused. Drivability of the vehicle is thus prevented from being lowered by such strange sensation.

For a case where the vehicle is mired and needs to escape, the driver repeatedly switches the shift mechanism between a non-drive position (the neutral position) and a drive position. In this case, the shift mechanism may be switched from the non-drive position to the drive position with the accelerator held in an ON state. Such an operation to move the vehicle out of a mire is hampered by an excessive decrease of the drive force of the drive source through the drive force limiting process. This may disadvantageously decrease the drivability of the vehicle in the operation to move the vehicle out of a mire.

To solve this problem, the drive force limiting process employs a small decrease amount of the drive force of the drive source when the shift mechanism is switched from the neutral position, which is a non-drive position, to a drive position, compared to when the shift mechanism is switched from the park position, which is also a non-drive position, to a drive position. Specifically, in many cases of operations to move a vehicle out of a mire, the driver switches the shift mechanism between the neutral position and a drive position in a repeated manner. When the shift mechanism is switched from the neutral position to a drive position, the drive force limiting process employs the small decrease amount of the aforementioned drive force compared to when the shift mechanism is switched from the park position to a drive position. This makes it unlikely for the drive force limiting process to excessively decrease the drive force of the drive source. As a result, operation to move the vehicle out of a mire is accomplished without being hampered by an excessive decrease of the drive force of the drive source through the drive force limiting process, and the drivability of the vehicle is not degraded when the operation is carried out.

In accordance with one aspect of the present invention, when the shift mechanism is switched from the park position to a drive position, the control section executes the drive force limiting process to decrease the drive force of the internal combustion engine, which is the drive source, to the value corresponding to the idling value of the engine. Specifically, such switching of the shift mechanism from the park position to a drive position does not indicate that the driver is attempting to move the vehicle out of a mire. As a result, to reduce the aforementioned strange sensation experienced by the driver, it is preferable that the drive force limiting process employs a great decrease amount of the drive force of the drive source to a certain extent. In the present invention, when the shift mechanism is switched from the park position to a drive position, the drive force limiting process is carried out to decrease the drive force of the drive source (the internal combustion engine) to the value corresponding to the idling value of the engine. This effectively decreases the strange sensation experienced by the driver.

In accordance with another aspect of the present invention, when the shift mechanism is switched from the neutral position to a drive position, the control section performs the drive force limiting process to decrease the drive force of the drive source to such a value that the vehicle can move out of a mire. As a result, operation to move the vehicle out of a mire is carried out without being hampered by decrease of the drive force of the drive source through the drive force limiting process. Additionally, the aforementioned strange sensation experienced by the driver is decreased.

In accordance with a further aspect of the present invention, when the shift mechanism is switched from the neutral position to a drive position, the control section carries out the drive force limiting process to set the decrease amount of the drive force of the drive source to zero. The drive force limiting process is thus prevented from decreasing the drive force of the drive source when the vehicle is moved out of a mire. This facilitates operation to move the vehicle out of a mire and the drivability of the vehicle is improved in the operation.

BRIEF DESCRIPTION OF THE DRAWINGS

FIG. 4 is a graph representing the relationship between the determination value of the acceleration and the traveling speed of the automobile in the procedure.

MODES FOR CARRYING OUT THE INVENTION

An embodiment of a drive control device for an automobile according to the present invention will now be described with reference to FIGS. 1 to 4.

Figure 1:
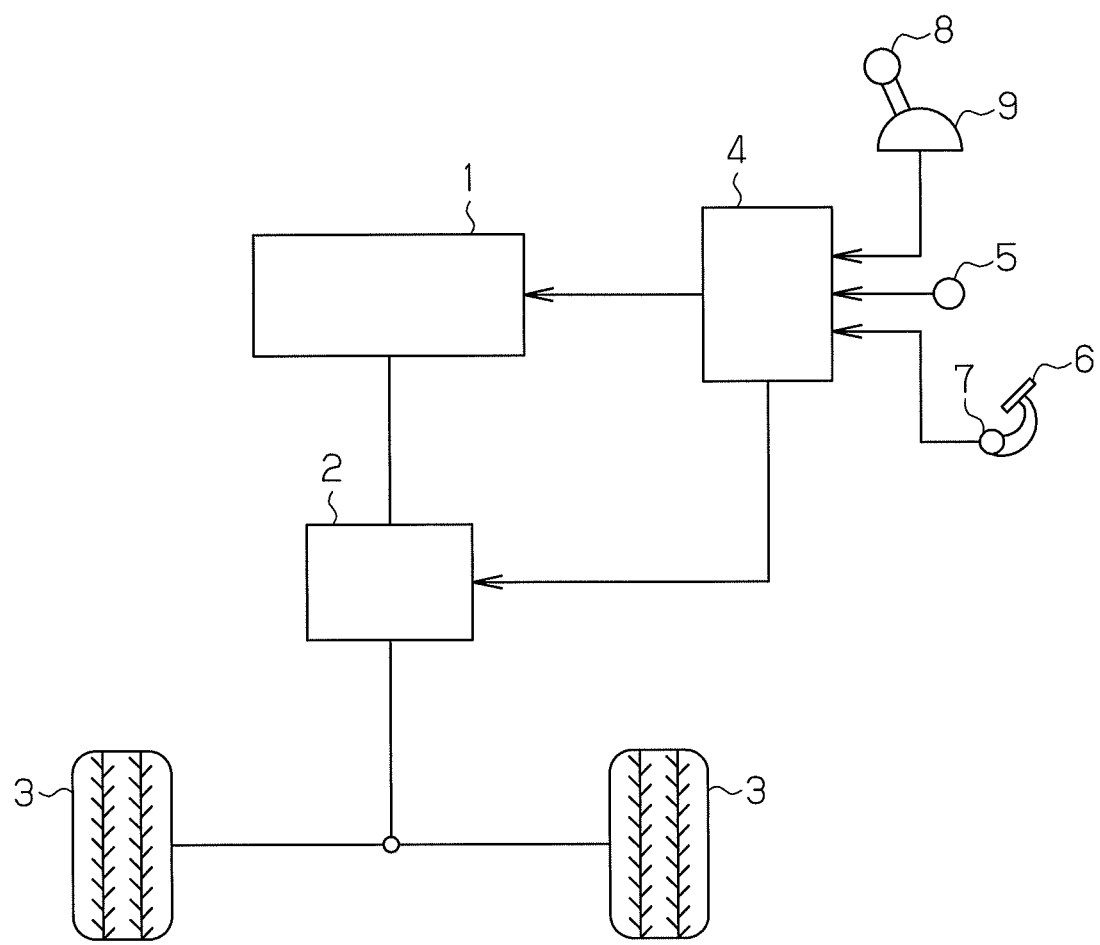
FIG. 1 is a schematic view showing an automobile, as a whole, employing a drive control device according to one embodiment of the present invention.

As shown in FIG. 1, the automobile has an internal combustion engine serving as a drive source 1. The drive force generated by the drive source 1 is transmitted to wheels 3 via a transmission 2 to rotate the wheels 3, thus moving the automobile. The transmission 2 has a plurality of gears. The gears may be combined in different manners in correspondence with a plurality of predetermined variable speeds. The transmission 2 selectively permits and blocks transmission of the drive force from the drive source 1 to the wheels 3. In other words, the transmission 2 functions as a drive force transmitting-blocking device.

The automobile has an electronic control unit 4 for carrying out various types of control procedures related to the drive source 1 and the transmission 2. Various types of sensors are connected to the electronic control unit 4, including a traveling speed sensor 5 for detecting the traveling speed of the automobile, an accelerator position sensor 7 for detecting the operating amount of an accelerator pedal 6 (the accelerator operating amount), which is depressed by the driver of the automobile, and a shift position sensor 9 for generating a signal corresponding to the position of a shift lever 8 (a shift mechanism), which is manipulated by the driver of the automobile. Drive circuits for driving the drive source 1 or the transmission 2 are connected to the electronic control unit 4.

The electronic control unit 4 adjusts the drive force output from the drive source 1 in accordance with the accelerator operating amount. The electronic control unit 4 switches the transmission 2 among the variable speeds and selectively permits and blocks transmission of the drive force from the drive source 1 to the wheels 3 in accordance with the accelerator operating amount, the traveling speed, and the operating position of the shift lever 8. Specifically, the shift lever 8 is switched among a plurality of operating positions such as a parking position, a reverse position, a neutral position, and a forward-gear position. The operating modes of the transmission 2 for the respective operating positions of the shift lever 8 will hereafter be described.

When the shift lever 8 is switched to the parking position, the electronic control unit 4 operates the transmission 2 to cause such a gear engagement as to prohibit rotation of the wheels 3 and block transmission of the drive force from the drive source 1 to the wheels 3. When the shift lever 8 is changed to the neutral position, the electronic control unit 4 operates the transmission 2 to permit the rotation of the wheels 3, which has been prohibited by the aforementioned gear engagement in the transmission 2, and block the transmission of the drive force from the drive source 1 to the wheels 3. That is, when the shift lever 8 is at the parking position or the neutral position, it is defined that the shift lever 8 is at an operating position for blocking the drive force transmission from the drive source 1 to the wheels 3 (hereinafter, a "non-drive position").

When the shift lever 8 is switched to the forward-gear position, the electronic control unit 4 operates the transmission 2 to transmit the drive force from the drive source 1 to the wheels 3 in a forward rotating direction. When the shift lever 8 is changed to the reverse position, the electronic control unit 4 operates the transmission 2 to transmit the drive force from the drive source 1 to the wheels 3 in a reverse rotating direction. In other words, when the shift lever 8 is at the forward-gear position or the reverse position, it is defined that the shift lever 8 is at an operating position for transmitting the drive force from the drive source 1 to the wheels 3 (hereinafter, a "drive position").

To start the automobile from a stopped state, the driver switches the shift lever 8 from a non-drive position such as the parking position to a drive position such as the forward-gear position or reverse position usually before depressing the accelerator pedal 6 from the OFF state to the ON state. However, there may be a case where the driver is in a hurry and inadvertently depresses the accelerator pedal 6 from the OFF state to the ON state (operates the accelerator pedal 6 to the ON state) before switching the shift lever 8 from the non-drive position to the drive position. In other words, while mistakenly assuming that he/she is performing the normal procedure, the driver actually operates in an unusual manner in which the shift lever 8 is switched from the non-drive position to the drive position with the accelerator pedal 6 held in the ON state.

As a result of the above-described unintentional unusual operation by the driver, actual behavior of the automobile is not what the driver expects would happen. Specifically, the driver expects the automobile to start when the accelerator pedal 6 is depressed to the ON state. However, the automobile actually starts when the shift lever 8 is switched from the non-drive position to the drive position, which causes transmission of the drive force from the drive source 1 to the wheels 3, after the accelerator pedal 6 has been depressed. That is, when the shift lever 8 is switched from the non-drive position to the drive position with the accelerator pedal 6 held in the ON state, the drive force is transmitted from the drive source 1 to the wheels 3 and the automobile starts. This inevitably causes the driver to feel strange, thus degrading drivability of the automobile.

To solve this problem, in the illustrated embodiment, a drive force limiting process is carried out to decrease the drive force of the drive source 1 when the drive force is to be output in accordance with the accelerator operating amount, if the shift lever 8 is switched from the non-drive position to the drive position with the accelerator pedal 6 held in the ON state. Accordingly, the drive force limiting process is performed if the driver is in a hurry and, in an attempt to start the automobile quickly, inadvertently depresses the accelerator pedal 6 from the OFF state to the ON state before switching the shift lever 8 from the non-drive position to the drive position to start the automobile from the stopped state. In other words, when the shift lever 8 is switched from the non-drive position to the drive position by the driver with the accelerator pedal 6 maintained in the ON state, the drive force limiting process is carried out to decrease the drive force output from the drive source 1. As a result, when the shift lever 8 is switched from the non-drive position to the drive position in the above-described manner, the drive force is prevented from being transmitted from the drive source 1 to the wheels 3 to start the automobile, causing the driver to feel strange. This prevents the driver from feeling strange due to switching of the shift lever 8 from the non-drive position to the drive position with the accelerator pedal 6 held in the ON state, thus maintaining the drivability of the automobile without being lowered by such strange sensation.

To move a vehicle out of a mire, the driver may repeatedly switch the shift lever 8 between a non-drive position (the neutral position) and a drive position (the forward-gear position or the reverse position). In such shift lever switching, the shift lever 8 may be switched from a non-drive position to a drive position with the accelerator held in the ON state. In this case, if the drive force limiting process excessively decreases the drive force provided by the drive source 1, the vehicle may not be easily moved out of a mire. This may disadvantageously degrade the drivability of the vehicle in the operation to move the vehicle out of a mire.

To solve this problem, the drive force limiting process employs a small decrease amount of the drive force of the drive source 1 when the shift lever 8 is switched from the neutral position, which is a non-drive position, to a drive position, compared to when the shift lever 8 is switched from the park position, or a non-drive position, to a drive position.

Figure 2:
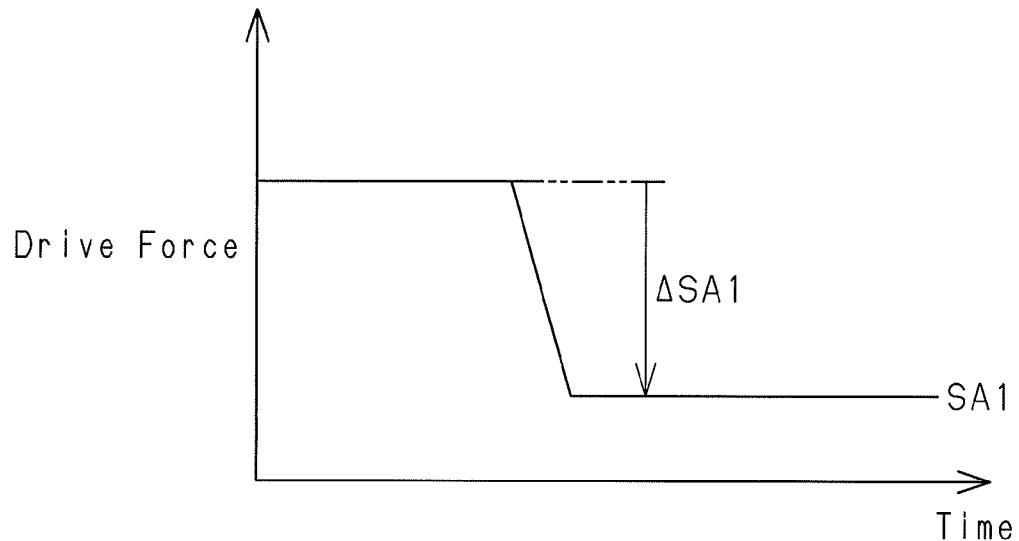
FIG. 2 is a timing chart representing how the drive force limiting process decreases the drive force.

Specifically, in the drive force limiting process, the drive force output from the drive source 1 is decreased to a value SA1, which corresponds to the idling value as illustrated in FIG. 2, when the shift lever 8 is switched from the park position to a drive position. In other words, the required drive force, which represents the drive force that must be provided by the drive source 1 in accordance with the current accelerator operating amount, is determined based on the current accelerator operating amount. The difference between the thus obtained required drive force and the aforementioned value SA1 is defined as the decrease amount $\Delta SA1$, which corresponds to the decrease amount of the drive force of the drive source 1 in the drive force limiting process. The drive force output from the drive source 1 is then adjusted to the value obtained by subtracting the decrease amount $\Delta SA1$ from the required drive force. As a result, in the drive force limiting process, the drive force provided by the drive source 1 is decreased by the decrease amount $\Delta SA1$.

Figure 3:
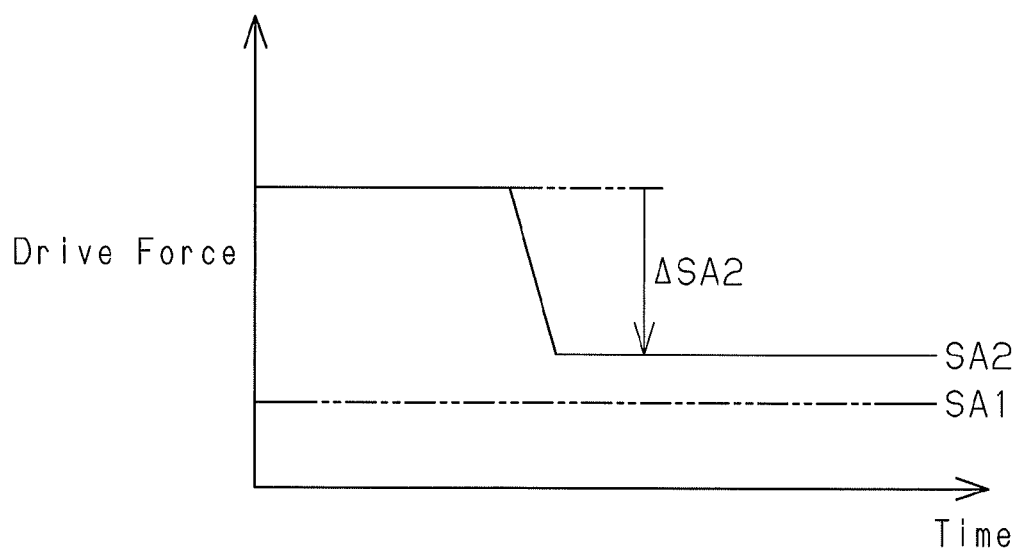
FIG. 3 is another timing chart representing how the drive force limiting process decreases the drive force.

In contrast, at the execution of the drive force limiting process, if the shift lever 8 is switched from the neutral position to a drive position with the accelerator operating amount held in the same conditions as the conditions represented in FIG. 2, for example, the drive force of the drive source 1 is decreased to the value SA2, which is greater than the value SA1 corresponding to the idling value, with reference to FIG. 3. In other words, the difference between the required drive force, which is determined based on the current accelerator operating amount, and the value SA2 is defined as the decrease amount $\Delta SA2$, which corresponds to the decrease amount of the drive force provided by the drive source 1 in the drive force limiting process. The drive force of the drive source 1 is then adjusted to the value obtained by subtracting the decrease amount $\Delta SA2$ from the required drive force. As a result, in the drive force limiting process, the drive force of the drive source 1 is decreased by the decrease amount $\Delta SA2$. Since the value SA2 is greater than the value SA1, the decrease amount $\Delta SA2$ is smaller than the decrease amount $\Delta SA1$.

In many cases of operations to move the vehicle out of a mire, the driver repeatedly switches the shift lever 8 between the neutral position and a drive position. The drive force limiting process employs a small decrease amount of the drive force when the shift lever 8 is switched from the neutral position to a drive position, compared to when the shift lever 8 is switched from the park position to a drive position. This makes it unlikely for the drive force limiting process to excessively decrease the drive force output from the drive source 1. As a result, operation to move the vehicle out of a mire is accomplished without being hampered by an excessive decrease of the drive force of the drive source 1 through the drive force limiting process, and the drivability of the vehicle is not degraded.

Specifically, the value SA2 is determined in advance, for example, through experimentation as the value corresponding to the drive force of the drive source 1 necessary for moving the vehicle out of a mire. As a result, when the shift lever 8 is switched from the neutral position to a drive position, the drive force limiting process is carried out to decrease the drive force of the drive source 1 to such a value that the vehicle can be moved out of a mire. Accordingly, decrease in the drive force of the drive source 1 through the drive force limiting control is reliably prevented from hindering escape from a mire, and the driver is prevented from experiencing strange sensation.

The steps for executing the drive force limiting process will hereafter be described with reference to the flowchart shown in FIG. 4, which represents a drive force limiting routine. The drive force limiting routine is performed by the electronic control unit 4 periodically through, for example, interruption at predetermined time intervals.

According to the routine, to determine whether the drive force limiting process is currently carried out, it is determined whether the flags F1, F2 are 0 (indicating that the procedure is currently suspended) (S101, S102). If a positive determination is made both in steps S101 and S102, determination whether the accelerator pedal 6 is in the ON state (S102) is carried out followed by determination whether the shift lever 8 has been switched from the parking position to a drive position (S104). Switching of the shift lever 8 from the park position to a drive position may happen in cases where the shift lever 8 is switched from the park position to the forward-gear position or from the park position to the reverse position to start the vehicle from a parked state.

If the accelerator pedal 6 is in the ON state and the shift lever 8 has been switched from the parking position to the drive position, positive determinations are made in both steps S103 and S104. In this case, the drive force of the drive source 1 is decreased from the value (the required drive source) corresponding to the accelerator operating amount to the value SA1 through the drive force limiting process (S105). Subsequently, the flag F1 is set to 1 (indicating that the drive force limiting process is currently in execution) (S106). When the flag F1 is 1 (the procedure in execution), a negative determination is made in Step S101. In this case, Step S105 and the subsequent steps are performed without carrying out Steps S102 to S104.

In contrast, if a negative determination is made in S104, it is determined whether the shift lever 8 has been switched from the neutral position to a drive position (S107). Specifically, such switching of the shift lever 8 from the neutral position to a drive position includes cases where the shift lever 8 is switched from the neutral position to the forward-gear position or the reverse position by the driver to move the vehicle out of a mire. If the neutral position is located between the forward-gear position and the reverse position, the driver may switch the shift lever 8 between the forward-gear position and the reverse position in a repeated manner to move the vehicle out of a mire. Such switching is also included in the switching of the shift lever 8 from the neutral position to a drive position.

When the shift lever 8 is switched from the neutral position to a drive position with the accelerator pedal 6 held in an ON state, a positive determination is made in S107. In this case, the drive force output from the drive source 1 is reduced from the value (the required drive force) corresponding to the accelerator operating amount to the value SA2, which is greater than the value SA1, through the drive force limiting process (S108). Afterwards, the flag F2 is set to 1 (the procedure currently in execution) (S109). If the flag F2 is 1 (indicating current execution of the procedure), a negative determination is made in step S102. In this case, step S108 and the subsequent steps are performed without carrying out the steps S103, S104, or S107.

When the above-described drive force limiting process is in execution, the steps (S110 to S112), which are related to termination of the drive force limiting process, are performed. Through these steps, it is determined whether a required drive force, which is obtained as a function of the accelerator operating amount as the drive force that must be output from the drive source 1 in accordance with the accelerator operating amount, is less than a control drive force, which is the drive force limited through the drive force limiting process (S110: YES). For example, if the driver releases the accelerator pedal 6 from the ON state to the OFF state and the accelerator operating amount drops to zero, the required drive force decreases to a value less than the control drive force. In this case, a positive determination is made in step S110 and then the drive force limiting process is ended (S111) to stop limiting the drive force output from the drive source 1. After this point, the drive force output from the drive source 1 is adjusted to match the required drive force in accordance with the accelerator operating amount. Specifically, after the drive force limiting process is suspended, the flags F1, F2 are set to zero (indicating that the procedure is currently suspended) (S112).

The illustrated embodiment has the advantages described below.

(1) To start the automobile quickly from a stopped state, the driver may inadvertently depress the accelerator pedal 6 from the OFF state to the ON state before switching the shift lever 8 from a non-drive position to a drive position. In this case, that is, if the shift lever 8 is switched from the non-drive position to the drive position with the accelerator pedal 6 held in the ON state, the drive force limiting process is carried out to decrease the drive force of the drive source 1 when the drive force is output from the drive source 1 in accordance with the accelerator operating amount. This prevents the automobile from being started by the drive force transmitted from the drive source 1 to the wheels 3 in response to the shift lever 8 switched from the non-drive position to the drive position in the above-described manner, thus preventing the driver from feeling strange. As a result, the strange sensation experienced by the driver caused at the time when the shift lever 8 is switched from the non-drive position to the drive position with the accelerator pedal 6 held in the ON state is prevented from happening. The drivability of the automobile is thus prevented from being lowered by such strange sensation experienced by the driver.

(2) The drive force limiting process employs a small decrease amount of the drive force of the drive source 1 when the shift lever 8 is switched from the neutral position, which is a non-drive position, to a drive position compared to when the shift lever 8 is switched from the park position, which is another non-drive position, to a drive position. Specifically, in many cases of operations to move the vehicle out of a mire, the driver repeatedly switches the shift lever 8 between the neutral position and a drive position. The decrease amount of the aforementioned drive force in the drive force limiting process is small when the shift lever 8 is switched from the neutral position to a drive position compared to when the shift lever 8 is switched from the park position to a drive position. This makes it unlikely for the drive force limiting process to excessively decrease the drive force of the drive source 1. As a result, operation to move the vehicle out of a mire is accomplished without being hampered by an excessive decrease of the drive force of the drive source 1 through the drive force limiting process, and the drivability of the vehicle is not degraded in the operation.

(3) When the shift lever 8 is switched from the park position to a drive position, the drive force limiting process is carried out to decrease the drive force of the drive source 1 to the value SA1 corresponding to the idling value. Specifically, such switching of the shift lever 8 from the park position to a drive position does not indicate that the driver is attempting to move the vehicle out of a mire. It is thus preferable that the decrease amount of the drive force of the drive source 1 in the drive force limiting process be great to a certain extent, to reduce the strange sensation experienced by the driver. In the illustrated embodiment, if the shift lever 8 is switched from the park position to a drive position, the drive force limiting process is carried out to decrease the drive force of the drive source 1 to the value SA1 corresponding to the idling value. This effectively reduces the strange sensation experienced by the driver.

(4) If the shift lever 8 is switched from the neutral position to a drive position, the drive force limiting process is performed to decrease the drive force of the drive source 1 to such a value that the vehicle can be moved out of a mire. Specifically, the current drive force is reduced to the value SA2, which is determined in advance, for example, through experimentation as the value corresponding to the drive force of the drive source 1 necessary for moving the vehicle out of a mire. As a result, operation to move the vehicle out of a mire is accomplished reliably without being hampered by decrease of the drive force of the drive source 1 through the drive force limiting process, and the aforementioned strange sensation experienced by the driver is decreased in the operation.

The illustrated embodiment may be modified to the forms described below.

The value SA2 may be set as the required drive force, which is the drive force corresponding to the accelerator operation, such that the decrease amount ΔSA2 is 0. In this case, when the shift lever 8 is switched from the neutral position to a drive position, the decrease amount of the drive force of the drive source 1 is zero in the drive force limiting process. The drive force limiting process is thus prevented from decreasing the drive force of the drive source 1 when the vehicle is moved out of a mire. This facilitates operation to move the vehicle out of a mire and the drivability of the vehicle is improved in the operation.

Any suitable shift mechanism other than the shift lever 8, such as a shift mechanism manipulated through buttons to switch between a drive position and a non-drive position, may be employed as the shift mechanism.

The internal combustion engine has been cited as the drive source 1 of the automobile. However, the drive source 1 may be a motor. Alternatively, a combination of an internal combustion engine and a motor may be employed collectively as the drive source 1. In this case, the internal combustion engine and the motor may be switched between each other or used in combination to serve as the drive source.

DESCRIPTION OF THE REFERENCE NUMERALS

1 . . . drive source, 2 . . . transmission, 3 . . . wheel, 4 . . . electronic control unit, 5 . . . traveling speed sensor, 6 . . . accelerator pedal, 7 . . . accelerator position sensor, 8 . . . shift lever, 9 . . . shift position sensor.

The invention claimed is:

1. A drive control device for a vehicle, comprising:
   a control section that adjusts drive force output from a drive source in accordance with operation of an accelerator; and
   a shift mechanism switched selectively to a drive position and a non-drive position, wherein
   the drive control device transmits the drive force from the drive source to a wheel when the shift mechanism is arranged at the drive position,
   the drive control device blocks transmission of the drive force from the drive source to the wheel when the shift mechanism is arranged at the non-drive position,
   the control section is configured to execute a drive force limiting process through which the drive force output from the drive source is decreased when the shift mechanism is switched from the non-drive position to the drive position with the accelerator held in an ON state,
   the non-drive position is one of a plurality of non-drive positions including a neutral position and a park position, and
   the control section is configured to execute the drive force limiting process with a smaller decrease amount of the drive force of the drive source when the shift mechanism is switched from the neutral position to the drive position than when the shift mechanism is switched from the park position to the drive position.

2. The device according to claim 1, wherein
   the drive source is an internal combustion engine, and
   at the execution of the drive force limiting process, the control section decreases the drive force of the engine to a value corresponding to an idling value of the engine when the shift mechanism is switched from the park position to the drive position.

3. The device according to claim 1, wherein, at the execution of the drive force limiting process, the control section decreases the drive force of the drive source to such a value that the vehicle can escape from a mire when the shift mechanism is switched from the neutral position to the drive position.

4. The device according to claim 1, wherein, at the execution of the drive force limiting process, the control section sets the decrease amount of the drive force of the drive source to zero when the shift mechanism is switched from the neutral position to the drive position.

* * * * *